US 6,534,431 B1

(12) United States Patent
Suntola et al.

(10) Patent No.: US 6,534,431 B1
(45) Date of Patent: *Mar. 18, 2003

(54) PROCESS AND APPARATUS FOR PREPARING HETEROGENEOUS CATALYSTS

(75) Inventors: Tuomo Suntola, Espoo (FI); Eeva-Liisa Lakomaa, Espoo (FI); Hilkka Knuuttila, Porvoo (FI); Pekka Knuuttila, Porvoo (FI); Outi Krause, Sipoo (FI); Sven Lindfors, Espoo (FI)

(73) Assignee: Fortum Oil and Gas Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/881,254

(22) Filed: Jun. 24, 1997

Related U.S. Application Data

(63) Continuation of application No. 07/910,136, filed as application No. PCT/FI91/00017 on Jan. 16, 1991, now abandoned.

(30) Foreign Application Priority Data

Jan. 16, 1990 (FI) .................................................. 900252

(51) Int. Cl.⁷ .............................................. C23L 16/08
(52) U.S. Cl. .................... 502/60; 502/104; 502/256; 502/355; 427/248.1; 427/255.15; 427/255.17; 427/255.7
(58) Field of Search .................... 502/60, 104, 256, 502/355; 427/248.1, 255, 255.7, 255.15, 255.17

(56) References Cited

U.S. PATENT DOCUMENTS

2,965,686 A    12/1960  Prill (List continued on next page.)

FOREIGN PATENT DOCUMENTS

EP            0345856 A1    12/1989

OTHER PUBLICATIONS

Iler, *The Chemistry of Silica*, John Wiley & Sons, pp. 644–645 and 676–679 (1979). (No month).

(List continued on next page.)

*Primary Examiner*—Timothy Meeks
(74) *Attorney, Agent, or Firm*—Birch, Stewart, Kolasch & Birch, LLP

(57) ABSTRACT

The invention relates to a process and to an apparatus for preparing a heterogeneous catalyst having at least one catalytically active species bound to the surface of a support material. According to the process, the surface of the support is first pretreated. A catalyst reagent containing the catalytically active species or its precursor is vaporized and the vapor is routed into a reaction chamber where it is brought to interact with the support material. The catalyst reagent not bound to the support is withdrawn from the reaction chamber in gaseous form. If necessary, the species bound to the support is posttreated in order to convert it into a catalytically active form. According to the invention, the amount of catalyst reagent brought into the reaction chamber is at least equal to, preferably in excess of the number of available binding sites on the surface. The temperature of the support of kept higher than the condensation temperature of the vapor and at the same time at a sufficiently high level to attain the thermal activation energy needed for forming bonds between the active species and the support. By binding the catalytically active species in this way to the support it is possible to provide a heterogeneous catalyst having a high activity even at small amounts of the active species.

13 Claims, 6 Drawing Sheets

U.S. PATENT DOCUMENTS

| | | | | |
|---|---|---|---|---|
| 3,013,984 A | * | 12/1961 | Breck | 502/79 |
| 3,236,910 A | * | 2/1966 | Bukata et al. | 502/60 |
| 3,243,174 A | * | 3/1966 | Sweet | 422/244 |
| 3,346,511 A | * | 10/1967 | Hill | 502/256 |
| 3,658,927 A | * | 4/1972 | Crain et al. | 502/355 |
| 4,062,808 A | * | 12/1977 | Gandhi et al. | 502/355 |
| 4,235,749 A | * | 11/1980 | Gens | 502/174 |
| 5,124,293 A | | 6/1992 | Lindfors et al. | |
| 5,183,794 A | | 2/1993 | Knuuttila et al. | |
| 5,183,796 A | | 2/1993 | Knuuttila et al. | |
| 5,290,748 A | | 3/1994 | Knuuttila et al. | |
| 5,372,982 A | * | 12/1994 | Hietala et al. | 502/226 |

OTHER PUBLICATIONS

Kirk–Othmer, *Encyclopedia of Chemical Technology*, $3^{rd}$ Edition, vol. 20, John Wiley & Sons, pp. 766–781 (1982) (No month).

Kiselev et al., *Russian Journal of Physical Chemistry*, vol. 60, No. 7, pp. 1019–1023 (1986) (No month).

Kol'tsov et al., *Russian Journal of Physical Chemistry*, vol. 42, No. 5, pp. 630–632 (1968) (No month).

* cited by examiner

Figure 2. The binding of Zn as a function of the reaction temperature

Figure 3. The binding of Zn from ZnCl$_2$ as a function of the reaction temperature Figure 4. The effect of preheating on Cr binding from $CrO_2Cl_2$ to silica. The reaction was performed at three temperatures (T = 175, 270 and 360°C)

Figure 5. The binding of Cr to silica as a function of the reaction temperature

PROCESS AND APPARATUS FOR PREPARING HETEROGENEOUS CATALYSTS

This application is a continuation, of application Serial No. 07/910,136 filed on Sep. 16, 1992, now abandoned.

BACKGROUND OF THE INVENTION

1. Field of the Invention

The present invention relates to a process according to the preamble of claim 1, for preparing a heterogeneous catalyst comprising a support and at least one catalytically active species bound to its surface.

According to such a process, the surface of the support is optionally first pretreated. The catalyst reagent containing the catalytically active species or its precursor is vaporized and the vapour is conducted to a reaction chamber where it is contacted with the support. The catalyst reagent not bound to the support is then withdrawn in gaseous form from the reaction chamber. If necessary, the species bound to the support is posttreated in order to convert it into a catalytically active form.

2. Description of the Related Art

As far as the prior art is concerned, reference is made to the following publications:

1. GB Patent Specification No. 1,105,564 (1968)
2. U.S. Pat. Specification No. 4,262,102 (1981)
3. U.S. Pat. Specification No. 4,362,654 (1982)
4. U.S. Pat. Specification No. 4,380,616 (1983)
5. Kase, A., Asakura, K., Egawa, C. and Iwasawa, Y., New Pd/Ultra-Thin Amorphous-Oxide Layer/ZSM-5 Catalysts for Selective Formation of Propane from $CO/H_2$, Chem. Lett. 6 (1986) 855–858
6. Asakura, K. and Iwasawa, Y., The Surface Structure and Catalytic Properties of One Atomic Layer Amorphous Niobium Oxide Attached on Silicon Dioxide, Chem. Lett. 6 (1986) 859–862
7. Asakura, K. and Iwasawa, Y., New Reversible Enhencement/Depression Phenomenon on Catalysis of Platinum Supported on One Atomic Layer Niobium Oxide for Ethane Hydrogenation, Chem. Lett. 4 (1988), 633–636
8. Asakura, K, Aoki., M. and Iwasawa, Y, Selective Isopentane Formation from $CH_3OH$ on a New One Atomic Layer $ZrO_2$/ZSM-5 Hybrid Catalyst, Catalysis Lett. 1(1988), 395–404
9. McDaniel, M. P., The State of Cr(VI) on the Phillips Polymersation Catalyst II: The Reaction between Silica and $CrO_2Cl_2$, Journal of Catalysis 76 (1982) 17–28
10. U.S. Pat. Specification No. 4,439,543 (1984)

Traditionally, heterogeneous catalysts have been prepared by depositing catalytically active compounds from the liquid phase onto the surface of the support by means of impregnation, precipitation or ion exchange. The starting materials used here comprise chemical compounds, often salts, which are soluble in known solvents. The solvents most frequently employed are water and different alcohols.

One drawback of the conventional technology is the large number of stages involved in catalyst preparation. The preparation of catalysts is recognised as an extremely delicate procedure requiring very accurate control of each requisite stage of the process.

Another drawback of prior art methods is associated with the need for solvents. The solvents by themselves often react with the support causing changes to the surface structure. This is particularly the case with the use of zeolites as the support material. The acidity of the surface has a decisive effect on the activity of the catalyst. The acidity is influenced both by the type of the acid sites, for example, the Brönstedt and Lewis type, as well as by the number of sites. The acid sites can be influenced by, e.g., different heat treatments. When zeolites are treated with solvents, especially water, after a heat treatment, a definite change in the distribution of the acid sites is discernible. At least some of the acid sites then assume reversibly different forms. Thus, it is clear that the degree of acidity cannot be controlled during impregnation or ion exchange.

In addition to the above-mentioned drawbacks, the solvents used are often contaminated with impurities that can adversely affect the activity of the catalyst.

In order to eliminate the cited drawbacks of the liquid phase preparation processes, a number of different gas phase processes have been developed.

Reference [1] outlines a process that involves heating rhenium heptoxide to a temperature in the range from 150° to 700° C. and allowing the vapor to condense on the surface of an aluminum oxide support which is maintained at a temperature below 50° C. Alternatively, the reaction is carried out at a temperature between 500° and 600° C., the $Re_2O_7$ partially decomposing to rhenium metal and forming a metal deposition on the alumina. The citation includes an example disclosing the preparation of a catalyst containing 14% $Re_2O_7$.

In the following three references [2, 3 and 4], processes for preparing silica-supported chromium catalysts have been described. The U.S. Pat. Specification No. 4,262,102 presents a method that involves vaporizing elemental chromium by heating it to a temperature of from 1400° to 1700° C. in a high vacuum metal evaporator, the chromium sublimating from the vapour phase on a chilled support in the form of small particles [2]. The procedures described in U.S. Pat. Specifications Nos. 4,362,654 and 4,380,616 comprise placing the silica support and a piece of chromium metal in a round-bottomed flask, evacuating the flask, and stirring the silica in the flask with a magnetic stirrer. The chromium is vaporized by heating with heat resistances [2 and 4]. In this case also, the chromium adheres to the support surface in the form of small particles.

In processes of the above type, the dispersion of the active metal may be heterogenic and there is not yet a proper understanding of how the carbene complex is formed on the catalyst.

In the Department of Chemistry at Tokyo University, researchers have prepared different catalysts having extremely thin layers, known as "atomic layers", of metal oxide bound to the surface of the supports [5–8]. Ideally, the catalysts comprises 1 to 3 of these atomic layers. Reference [5] discloses the preparation of catalysts having ultra-thin $La_2O_3$, $TiO_2$, $SiO_2$, and $Nb_2O_5$ layers on the outer surface of a zeolite (ZSM-5). Reference [6] describes the corresponding catalysts having a $SiO_2$ support. According to reference [5], catalysts containing $SiO_2$ and $TiO_2$ are prepared by contacting methyltriethoxysilane and titanium isopropoxide vapors with the hydroxyls of ZSM-5 surfaces at 473 K (200° C.) in a vacuum. Similarly, the $ZrO_2$/ZSM-5 hybrid catalyst was prepared by contacting vaporized Zr tetraoxide having a vapour pressure of 133 Pa at 473 K with ZSM-5 at the same temperature. By repeating the binding reaction about 3 times, in both cases a single atom oxide layer covering the whole surface of the support was obtained.

According to the authors of the cited articles, the catalysts thus prepared have unique properties. Inwparticular, the catalysts exhibit good selectivity. Thus, the catalysts prepared according to reference [5] are used for selective propane preparation from CO and $H_2$. The catalyst described in reference [6] is used during ethanol dehydrogenation, this catalyst being more active and selective than a catalyst prepared by impregnation or $Nb_2O_5$. The catalyst cited in reference [8] activates the formation of isopentane from methanol.

The common feature of the methods cited in references [5] to [8] is that first, a thin oxide layer is prepared on the surface of the support. The starting metal compound is chosen such that it does not fit into the cavities of the zeolite [5, 8].

McDaniel has studied the state of chromium(VI) on a Phillips polymerisation catalyst [9] and he has also, together with Stricklen, patented a process for preparing a CO-reduced chromyl halide silica-supported catalyst [10]. The starting compounds chosen include $CrO_2Cl_2$, $CrO_2F_2$ and $CrO_2FCl$. Before depositing the starting compound on the support, the surface of the support was heated in an oxidising atmosphere, such as air, at a temperature within the range of 400 to 1000° C. in order to remove the hydroxyl groups on the support. After the oxidising treatment, the oxygen was purged by nitrogen or argon gas flushing. At normal pressure and at a temperature ranging from 100 to 400° C., a known amount of the reagent, in the example 0.5 to 4.0 ml of chromyl chloride, was then injected into a stream of nitrogen gas conducted through the support, the reagent vapours reacting with the hydroxyl groups of the support. Unreacted reagent vapor was withdrawn from the reactor.

The surfaces of the support particles used in heterogeneous catalysts are structurally inhomogeneous. As far as zeolites are concerned, the crystalline structure of the material is also complex containing, e.g., pore openings having diameters ranging from 0.3 to 0.7 nm. As a consequence of the above characteristics, the surfaces of the support materials are chemically inhomogeneous containing numerous binding sites of different valencies for new atoms or molecules contacted with the surface of the support. It is difficult to control the binding of the metals or metal compounds used as reagents when following any of the conventional practices described above in references [5] to [10].

The conventional processes also present difficulties in achieving homogeneous dispersion of the metals or the metal compounds on the support surfaces.

SUMMARY OF THE INVENTION

The present invention aims at eliminating the drawbacks of the prior art and at providing an entirely novel technical solution for gas phase preparation of heterogeneous catalysts.

The invention is based on the concept of bringing the catalyst reagent in-vapour state to the reaction chamber in an amount that at least corresponds to the amount of binding sites on the support surface. It is preferred to use an excess of reagent in relation to the available surface binding sites. The temperature of the support is kept higher than the condensation temperature of the vapor and sufficiently high for the active species or its precursor to be chemisorbed on the surface of the support. In other words, the process aims at providing the thermal activation energy needed for the formation of bonds between the active species or its precursor and the surface of the support.

In particular, the process according to the invention is mainly characterised by the steps of optionally pretreating a surface of a support material, vaporizing a reagent containing a catalytically active species, or a reagent containing a precursor of a catalytically active species, to form a vapor, introducing this vapor into a reaction chamber containing the support material held at a higher temperature than the vaporization temperature of the catalyst reagent, and binding the catalytically active species to the support material under temperature, pressure, and reaction time conditions sufficient to saturate the available support binding sites, removing any unreacted catalytic reagent vapor and optionally posttreating the catalyst.

The apparatus for preparing the heterogeneous catalyst according to the invention is characterised by a reactor body, a gas tight reaction chamber fitted within the reactor body and adapted for holding the support material, a plurality of heaters placed around the reactor body whereby the desired temperatures in the reactor body and in the reaction chamber are obtained, inert gas feed piping and inert gas outlet piping connected to the reaction chamber, wherein said inert gas feed piping is at least partially located within the reactor body, whereby a protective gas atmosphere inside the reaction chamber is obtained, and whereby the material flowing in the inert gas feed piping can be heated to the desired temperature by the heaters, gaseous reagent sources connected to the reaction chamber by the inert gas feed piping whereby the catalytically active compound is fed to the reaction chamber, and means for withdrawing unreacted gaseous reagent surplus.

DETAILED DESCRIPTION OF THE INVENTION

Figure 1:
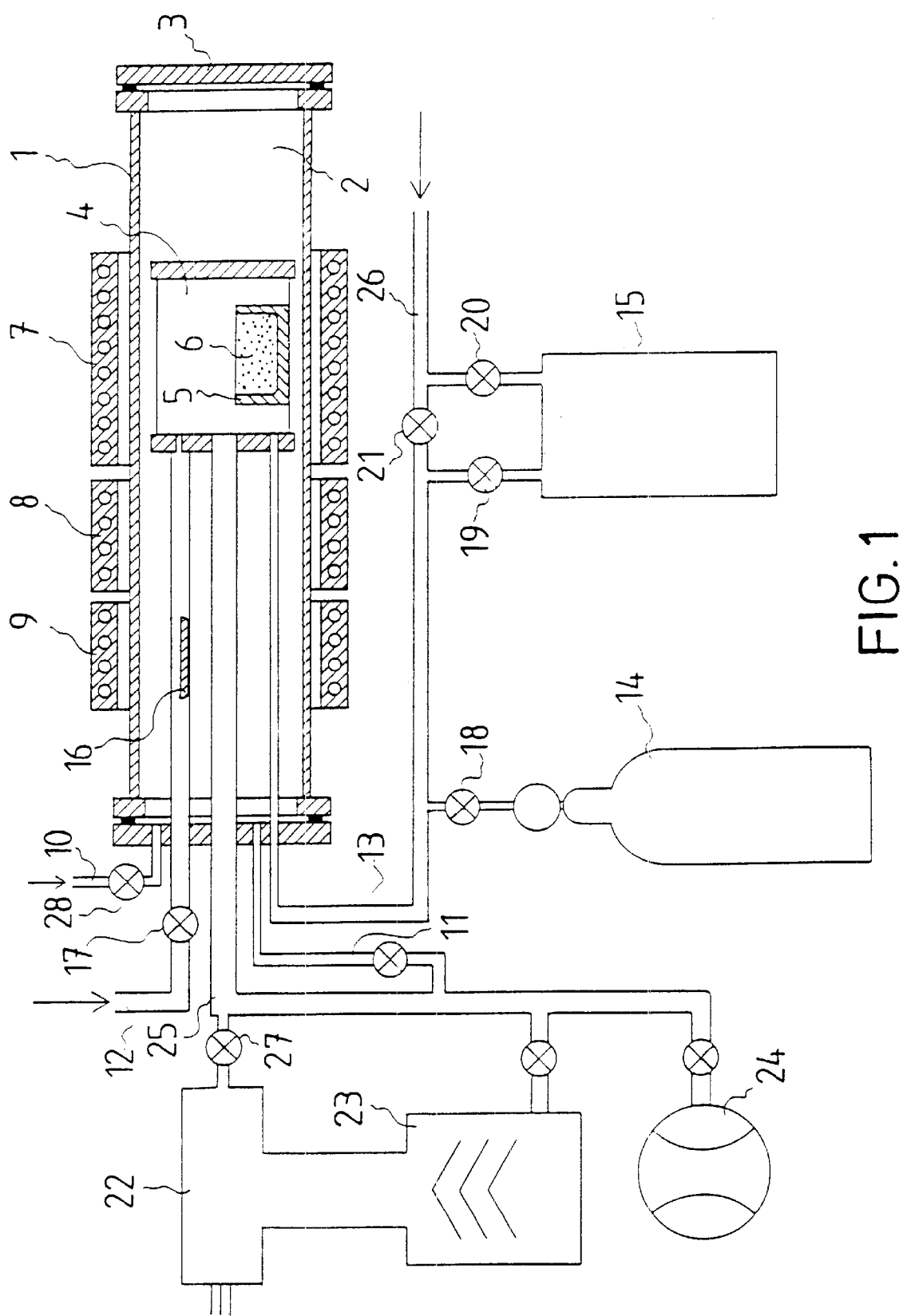
FIG. 1 shows in cross-section one possible reactor design for carrying out the process according to the invention.

Surprisingly, under the above-mentioned conditions a heterogeneous catalyst is obtained, whose activity is high even at small amounts of the active species.

All of the reasons underlying this phenomenona are not yet fully understood, and we do not wish to limit the invention to any particular theory. It does, however, appear possible that, under the conditions of the invention, the binding of the active species to the different binding sites of the surface is determined by the structural geometry of the surface atoms of the support and by the electron distribution (the surface energy potential). Thus, the chemisorption of the active species is surface selective.

For the purposes of the present application, the following definitions are used:

Catalyst reagent denotes a starting material in solid, liquid or gaseous state, whose vapur contains the component which, together with the support, forms the catalytically active sites on the surface of the support. The catalyst reagent employed can comprise any conventional reagent used for the preparation of heterogeneous catalysts, be it in the form of a gas or of a compound that can be volatilised. The reagent may, thus, comprise, inter alia, elemental metals, such as zinc, metal compounds, such as rhenium oxides and chromium halide compounds, and metal complexes, such as Mg(thd)$_2$.

The active species refers to the catalytically active component on the surface of the support, which can be in the form of an atom, an ion, a molecule, a chemical compound or a complex. Normally, the active species is comprised of the ion, atom or compound of a metal on the surface of the support.

The term "precursor" denotes basic forms of the active species which may be inactive but which will yield the active species by a suitable treatment.

The support comprises a solid material which has a rather large surface area for binding the catalytically active material or compound. The area of the support surface typically amounts to between 10 and 1000 m$^2$/g as determined by the BET method. The support may consist of an inorganic oxide, such as silica (silica gel), aluminium oxide (alumina), thorium oxide (thoria), zirconium oxide (zirconia), magnesium oxide (magnesia), or a mixture thereof. These types of supports are essentially catalytically inactive. The support used may also comprise a substance which itself catalyses the desired chemical reaction. These supports are exemplified by the natural or synthetic zeolites. It is to be understood that, within the scope of this application, the term "support" also encompasses inactive supports having a catalytically active species bound to their surface. Thus, for instance, when bimetal catalysts are prepared, the first species may provide the support surface for the second species.

The reaction chamber is the space, within which the support and the reagents are contacted.

Chemisorption refers, in general, to a process, in which the gaseous, liquid or dissolved compound is bound or attached to the surface of a solid or liquid substance in such a way that a bond, essentially of a chemical nature, is formed.

Physical adsorption (or physisorption) is a process which, in essence, involves the physical adsorption of a substance on the surface of another substance by intermolecular forces known as the van der Waals forces.

Condensation means the liquidification or solidification of vapors and gases by cooling.

The present process comprises three basic stages, including the pre- and post-treatment stages, which are part of the preferred embodiments of the invention, although they are not essential as far as the basic solution of the invention is concerned.

The process parameters of the method are the temperatures and the duration of each of the given stages. The selection of process parameters is influenced by the actual support-reactant combination.

In the present invention, all the reagents for the pretreatment, for the binding of the catalytically active species and for the posttreatment are routed to the reaction chamber in vapor form typically one at the time. The vapor pressure of the vaporized catalyst reagent is maintained at a sufficiently high level and the duration of its interaction with the surface of the support is sufficiently prolonged that at least an equal amount or, preferably, an excess of the reagent is provided in relation to the binding sites available on the support. In relation to the atom layer or molecular layer filling all of the available surface binding sites, a 1.5-to 1000-fold surplus of the reagent and preferably a 2-to 100-fold surplus is normally used. The monolayer amount of the species can be calculated using, for instance, the BET method on the basis of the surface of the support and the molecular structure of the surface.

In the context of the invention, reaction conditions are sought in which the gas-phase reagent (the active species or its precursor) fills all or essentially all of the binding sites available to provide saturation of the surface at the prevailing temperature.

During the reaction, the temperature should not be allowed to drop below the vaporization temperature of the reagent. Neither must the reagent be allowed to condense on its route to the reaction chamber, but the temperature of the feed piping should be kept close to the reaction temperature.

The reagent and the temperature employed are selected in such a way that the reagent does not decompose and the decomposition products, if any, do not condense.

In a preferred embodiment of the invention, a temperature gradient is formed, increasing from the reagent source towards the reaction chamber.

It is possible experimentally to determine a temperature range, or temperature interval, within which the reaction is most advantageously conducted. The lower limit of the temperature range is determined by the condensation temperature of the evaporated reagent and the activation energy necessary for establishing the desired surface bond. The condensation temperature is not, by itself, an appropriate lower limit if it is too low to provide the reagent with the energy needed for surpassing the activation threshold.

The upper limit is determined by the temperature at which the active species, or its precursor chemisorbed on the support, starts to show a significant rate of desorption from the binding site, i.e. when the equilibrium of the chemisorption-desorption reaction has shifted toward desorption. The reagent is selected such that the activation energy required by the chemisorption is exceeded at a temperature at which desorption is still not significant. In most cases, the activation and desorption energies are not known and, thus, the selection of suitable reactants and temperatures is determined by experimentation.

In the process consituting part of the present invention, the pretreatment, the binding and the posttreatment temperatures of the catalytically active component can differ from each other. However, it is required that limit $T_{min}$, for for each reagent used, be exceeded during each process stage. Sometimes the temperature of the pretreatment will influence the amount of active species or its precursor bound to the support. This is the case, for example, when chromium is bound to the surface of silica. The binding temperature ($>T_{min}$) might then, in turn, influence the amount of the active species or its precursor chemisorbed to the support. This phenomenon can be illustrated by the preparation of the alumina-supported rhenium and the silica-supported zinc catalysts. As will become evident from the following examples, the temperature is generally kept below 500° C., although this temperature does not represent an absolute upper limit.

The reaction between the catalyst reagent vapor and the support may be carried out at elevated pressure, ambient pressure or in a vacuum. In the preferred embodiment of the invention, the process is carried out at a reduced pressure ranging from 0.1 to 100 mbar. The benefit to be gained by using reduced pressure resides in improved purity of the reaction chamber and increased diffusion rate.

The pretreatment and posttreatment stages can, similarly, be carried out at elevated pressure, ambient pressure or reduced pressure.

The reaction time is predominantly affected by the penetration of the vapor molecules into the pores or cavities of the support. The gas diffusion between the support particles constitutes an extremely fast process in comparison to the diffusion towards the inner parts of the pores. The reaction time should be kept long enough to allow the vapor containing the active component to interact with the binding sites of the support and to provide the desired surface saturation. In the experiments conducted, the results have indicated that the reaction time can be selected in the range from 0.5 to 25 hours. Usually 1 to 4 hours is enough for achieving the desired goal.

In practice, the above-mentioned process parameters must be determined experimentally, since it is practically impossible to determine the exact binding properties between the support and the gas molecules. Almost every bound species affects and changes the surface areas immediately adjacent, which gives cause to changes in the surface potential.

Summarising, the different stages of the process can be characterised as follows:

Pretreatment

As mentioned above, the basic structure of the support materials of the heterogeneous catalyst are different. Thus, the atoms or molecules of the vapor phase catalytically active substance may, under the same ambient conditions, react in very different ways with different supports. The pretreatment stage of the support is, therefore, important. The pretreatment aims at providing the desired binding sites for the catalytically active component that is to be bound to the support.

The pretreatment can be effected by heating the support or by treating it chemically or as a combination of these two operations.

The heat treatment can, for instance, comprise increasing the temperature of the support to the same temperature as used for binding the active component. In this case, it is preferable for temperature to be increased at a steady rate over a given period of time.

The support may also be heated for some time, normally for between 1 min and 100 hours, preferably from between about 2 and 30 hours, at a selected pretreatment temperature that is either higher, as high as, or lower than the temperature used for binding the component. The suitable temperature depends on the support, on the catalytically active species to be bound, and on the binding temperature selected. A pretreatment temperature higher than the reaction temperature leads, with a high probability, to a stable and reproduceable surface situation in the actual reaction stage. Too high a pretreatment temperature may, however, change the desired surface structure of the support. At too low a temperature, it is not possible efficiently to remove undesired molecules of substances physically adsorbed on the surface.

In the chemical treatment of the support, the support can be treated with a chemical substance, such as water (steam), for forming hydroxyl groups on the surface, or alternatively, with a dehydrating agent for removing hydroxyl groups. The support can also be treated with a volatile metal compound, such as a magnesium or titanium compound.

It is also possible to combine the above-mentioned heat treatment and the chemical treatment, the support being heated to or maintained at the desired temperature, while subsequently contacting the surface with a chemical substance, such as steam. Thus, according to one embodiment of the invention, the support is pretreated at a high temperature for removing adsorbed water. After this, the temperature of the support may possibly be changed and steam allowed to interact with the surface, on which chemisorption of new hydroxyl molecules can then proceed. The actual reaction is thus finally carried out either at the same or at another temperature.

The Binding of the Active Species

The surface-activated support is contacted and interacts with vapour containing the component (i.e. species of precursor) that is to be bound. The component is bound to the surface by selectively filling the available surface binding sites. As mentioned above, the temperature and the duration of the process are determined experimentally for each support material, while taking the activation conditions and the characteristics of the vapour containing the binding component into account.

Several different kinds of active species may be bound to the support as an outcome of the process in the invention. In a multi-species catalyst, the binding order may vary, the result being different kinds of catalysts.

Modification of the Binding Surrounding of the Catalytically Active Species

In order to optimize the properties of the catalyst, the prepared specimen can, if necessary, be subjected to post-treatment. This may, for instance, comprise a heat treatment in which the catalyst is heated to a desired temperatures which generally is act least in excess of the binding temperature. When the degree of oxidation of the active site of the catalyst is to be changed, the heat treatment is carried out in oxidising or reducing conditions.

During the heat treatment the catalyst atoms may be contacted with a vapour, e.g. steam, that modifies the binding surroundings. This modification may be necessary, e.g. when the precursor of the catalytically active species comprises a reagent molecule deposited on the surface of the support, a part of which is to be removed after the binding. Thus, to continue the example, chlorine atoms are often detrimental to the activity of the catalyst and they can be removed by steam or hydrogen sulfide treatment.

In order to modify the properties of the catalyst, a single or several further species may be added by repeating the procedure described above in such a manner that a, vapor containing a new species or its precursor is chosen for the actual binding reaction. The stages of the process can be repeated for a desired amount of new species, with the option to conduct heat treatment and/or chemical treatment between the stages.

There are considerable benefits to be gained by the invention. Thus, for example, in the case of chromium-titanium/silica and rhenium/alumina catalysts, the catalysts have been found to be active at lower metal loadings than previously reported in the literature. This would suggest that the metal is more evenly distributed than in the catalysts prepared from solutions. The ability to control the binding of the metal during the preparation is improved. It is easier to bind several metals using the present invention than it is to bind several metals from solution. The metal may be bound in the form of different compounds to the same support, with the necessary ligands being readily obtainable. The impurities caused by the reagents are diminished. The temperature of the process may, in some cases, be lowered.

As a product of the process described in the invention, heterogeneous catalysts exhibiting different basic structures may be prepared. The catalysts used in oil refining, the metathesis catalysts and the polymerisation catalysts may be mentioned by way of example. In the following discussion, the main groups of catalysts are represented by zeolite-supported zinc, alumina-supported rhenium and silica-supported chromium. However, it is also possible to prepare other noble metal catalysts and transition metal catalysts.

In the following, the invention will be examined with the aid of a detailed description and working examples. It should be noted that the description relates only to some of the preferred embodiments of the invention. Within the scope of the invention, however, other embodiments are quite as conceivable.

Apparatus used for Dreparing the Catalysts According to the Invention

The test reactor used in the working examples comprises a lengthwise reactor body 1 and a reactor chamber 4 fitted within said reactor body. In the reactor chamber, there is a container 5 for the sample 6, i.e. the support material. In the reactor body 1 at the end containing the reactor chamber 4, there is a loading/unloading cover 3 for exchanging the reactor chamber with the sample container 5. In order to seal the reactor body 1 hermetically, the cover 3 is provided with suitable sealings, such as annular sealing rings.

Heating elements 7, 8, 9, are mounted around the reactor body 1 for providing the necessary temperature in the different parts of the reactor. The heating elements 7, 8, 9 can, for instance, consist of heat resistances.

A protecting gas, typically nitrogen and/or argon, is fed into the reactor chamber 4 through a feed conduit 10, the gas atmosphere within the reactor body 1 being controlled by a regulator mounted on the feed conduit 10. In order to provide reduced pressure, the reactor chamber 4 can be connected to a vacuum pump 24 by means of a suction pipe 25. The vacuum pump is also connected to the gas space defined by the reactor body 1 via a vacuum pipe 11. The vacuum pump used may be of a conventional membrane or piston pump type. If necessary, a liquid nitrogen trap should be fitted between the pump 24 and the evacuated spaces for collecting condensing fumes.

There are two feed conduits 12 and 13 fitted within the reactor chamber 4. It is possible to feed vaporized catalyst reagent via these pipes to the reactor chamber 4. The feed pipe 12 is connected to a gas source, the reagent transport gas being fed into the pipe at the point indicated with an arrow. The gas flow is controlled by a regulator 17. The vessel 16, which is also referred to in the following as the hot source, is used for reagents that are solid or liquid at ambient temperature. The reagent is vaporized by heating it to the desired vaporizing temperature by means of heaters 8 and 9. By adjusting the gas flow with the aid of the regulator 17, it is possible to control the flow of the reagent vapour generated in the hot source to the reaction chamber 4.

The second feed piping 13 is connected to two gas sources 14 and 15 used, for feeding reagents that are vaporous or liquid at ambient temperature. Pressurized reagent is fed from the gas source 14, which typically is a gas cylinder, via a valve 18 to the feed pipe 13. The gas source 15 is used for reagents having a rather low-vapour pressure in comparison to the reaction chamber. These reagents are normally liquid at room temperature. The regulators, i.e. for instance the valves 19, 20, 21, control the flow of the reagents from the gas source 15 to the feed pipe 13. The feed pipe 13 is connected before the regulator 21 to the transport gas source at the point indicated by an arrow (pipe section 26). The transport gases used for feeding the reagents from gas sources 14 and 15 preferably comprise inert gases, such as nitrogen and/or argon.

The reagents used for the chemical pretreatment are fed from sources 14, 15 or 16, respectively.

The apparatus used in the working examples further includes a mass spectrometer 22 for analyzing volatile reaction products from samples withdrawn through the regulator 27. The mass spectrometer also comprises a two-part pump arrangement 23 including a prepump and a high pressure pump.

The apparatus is used as follows:

A suitable amount of a support material 6 is placed in the sample container 5 in the reaction chamber 4. In the working examples, the scale of the operation has been small, and usually samples weighing in a range from 3 to 10 g have been used. A liquid or solid reagent is placed in container 16. The reactor body 1 and the reaction chamber 4 are subsequently evacuated by feeding protecting gas via the feed conduit 10 and the feeding pipe 13 at a low flow rate (controlled by regulator means 28 and 21), while providing a reduced pressure in the reaction chamber 5 by means of vacuum source 24. Normally, the goal is to achieve a pressure amounting to a few millibars, e.g. 3 to 10 mbar.

If necessary, the support 6 is then pretreated. As mentioned above, the heat treatment may be carried out using various heating times and temperatures; the temperature is normally in the range from about 200 to about 500° C., while the heating time is about 10 to 30 hours. During this period of time the reagent in container 16 is not normally added.

During chemical pretreatment or blocking, the reactants are fed from sources 14, 15 or 16. Thus, e.g. steam is conducted from source 15 by routing the protecting/transport gas flow via source 15 (valve 21 is closed and valves 20 and 19) are opened.

Before initiating the reaction, the temperature of the reagent in source 15 is increased to the desired level by the heater 9. Use of the heater 8 enables an increasing temperature gradient to be established between the hot source 16 and the reactor chamber 4, the temperature of the reactor chamber 4 being higher that the temperature of the hot source 16.

The regulator 17 is next opened and reactant vapour is fed by the transport gas into the reactor chamber 4. The reactant is metered at a dosage larger than that required by the number of surface binding sites.

The gaseous reagent diffuses into the support 6 in the sample container S and the surplus gas is withdrawn through channel 25 by means of the vacuum pump 24. A part of the gas stream flowing from the reaction chamber 4 is conducted via valve 27 to the mass spectrometer for analysis of its composition.

When using gaseous reagents, these are fed from gas sources 14 and 15. The reagents that are gaseous at room temperature are preferably fed from a gas cylinder 14, and liquid reagents from a liquid container 15. The reagents flowing through the feed pipe 13 are heated to the desired temperature by heaters 8 and 9. The temperature of the feed pipe is always kept higher than the condensation temperature of the reagents.

The process is continued until the desired surface reaction has reached a state of saturation. The supply of the reagent is then cut off. The temperature and the pressure are returned to normal (STP). If necessary, the catalyst is removed from the apparatus in an atmosphere of protecting gas.

Preparation of the Catalysts

1. Supports and Reagents

The zeolite support was comprised of a mixture of a HZSM-5-type zeolite and silica.

The zeolite was prepared as follows: 2300 g of tetra-propyl-ammonium bromide, 100 g of sodium aluminate, 2760 g of silica gel (Ludox), 114 g of sodium hydroxide and 18500 g of water were transferred into an autoclave, the temperature was increased to 1650° C., and the chemicals were allowed to react for 144 h. The mixture was then rapidly cooled to ambient temperature, after which the product was recovered and washed with 150 l water. The product obtained was dried for 24 h at 120° C. and calcined for 15 h at 540° C. The sodium-containing zeolite was ion exchanged with a 5% w/w ammonium nitrate solution. The ion exchanged product was dried for 24 h at 120° C. Next, the zeolite was calcined for 15 h at 540° C.

When the HZSM-5 zeolite (Si/Al=40) was ready, 100 g of the zeolite, 100 ml of silica gel (Ludox AS-40) and 10 ml of water were mixed in a mortar, molded into cakes, dried for 12 h at 115° C., powdered and calcined for 2 h at 540° C.

The support materials, silica and the γ-aluminium oxide were of commercial quality.

The most important data on the support materials are given in Table 1:

TABLE 1

The properties of the support materials

| | H-ZSM-5 | Silica | γ-Al$_2$O$_3$ |
|---|---|---|---|
| Particle size [μm] | 149–350 | 53–180 | 500–1000 |
| BET Surface [m$^2$/g] | 360 | 280–330 | 200 |
| Pore size [nm] (diameter) | 0.55 | 20 | |
| Number of molecules/g | 10$^{22}$ | 10$^{22}$ | 6 × 10$^{21}$ |
| Number of surface molecules/g | 2.5 × 10$^{21}$ | 2 × 10$^{21}$ | 1.6 × 10$^{21}$ |

The following reagents were used: metallic zinc, zinc chloride (ZnCl$_2$), chromium chloride (CrO$_2$Cl$_2$), rhenium heptoxide (Re$_2$O$_7$), aluminum chloride (AlCl$_3$), titanium chloride (TiCl$_4$) and magnesium dipivaloyl-methane [Mg(thd)$_2$]. The materials were of commercial grade, except for the last one, which was synthesized as described in the publication Hammon, G.S. et al., Inorg Chem 2 (1963), p. 73. The surface of the metallic zinc was treated with hydrochloric acid in order to remove the surface layer before use. Otherwise, the reagents were not pretreated.

2. Analysis

The amounts of elements bound to the supports were determined by means of atomic absorption spectrometry (Al, Ti, Cr, Zn), fluorescence spectroscopy (Zn), polarimetric titration (Cl) or neutron activation analysis (Re). X-ray induced photoelectron spectroscopy (XPS or ESCA) and X-ray diffraction analysis (XRD) were employed for evaluation of the metals on the surface of the catalyst.

EXAMPLE 1

The preparation of a zinc/zeolite catalyst This example illustrates the binding of a metal in elemental state to the surface of the support. Further, the impact of the reaction temperature on the amount of metal bound to the surface is considered in the example.

The zinc/zeolite catalyst is used in oil refining, e.g., for catalyzing the conversion of butane to aromatic compounds.

Several catalysts were prepared by binding zinc to the surface of zeolites. The support material lot weighing 2 to 10 g was placed in a sample vessel of a reaction chamber where it was heat treated at 430 to 465° C. in a nitrogen stream of 2 to 5 mbar pressure. The pretreatment time was 2 to 24 h.

Metallic zinc placed in a heated source was heated to 430*C and the zinc vapor was routed to the reaction chamber.

During each test the temperature of the reaction chamber was maintained above 430° C. in order to prevent the condensation of zinc onto the zeolite surface. The zinc vapor was reacted with the zeolite for 1 to 4 h.

The Zn concentrations in the prepared catalysts were between 0.03 and 10% w/w.

Some of the catalysts thus obtained were subsequently treated with sulphur. Elemental sulphur was placed in the hot source and sulphurous fumes evaporated from it were reacted with the Zn/zeolite catalyst at 465° C.

Figure 2:
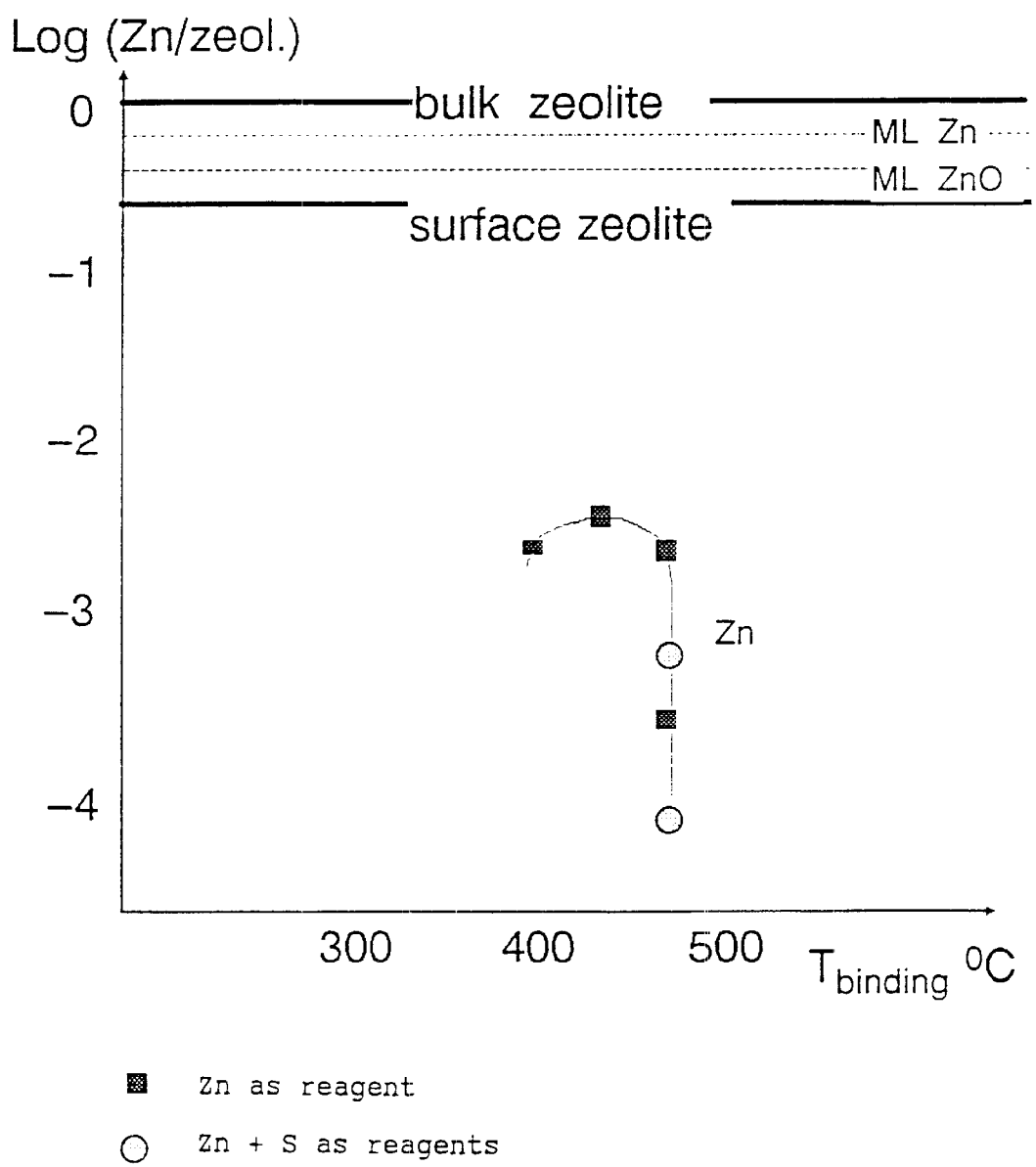
FIGS. 2 and 3 depict the binding of Zn on the surface of a zeolite support as a function of the binding temperature.

The binding of Zn as a function of the reaction temperature is depicted in FIG. 2. The Figure shows only the results obtained after 2 hours of preheating. Extension of the preheating period to 24 hours did not increase the binding of zinc to any larger extent. The logarithm of the ratio of Zn atoms to SiO$_2$+Al$_2$O$_3$ atoms was calculated for FIG. 2. The Zn concentration of the catalyst was measured giving the amount of Zn atoms per zeolite weight unit. From the known BET surface of the zeolite the number of surface molecules was calculated. As a reference, the number of Zn atoms or ZnO molecules in an atom or molecule layer completely covering the surface (monolayer, ML) was calculated.

The binding of the zinc is influenced by the adsorption, the formation of a chemical bond and the desorption. FIG. 2 shows that decreasing temperature and vapour pressure of zinc will reduce the amount of zinc bound to the surface. According to the present invention, the minimum temperature is represented by the condensation temperature of zinc, 390° C. The binding of zinc is also substantially decreased when the temperature rises above 500° C., which possibly is caused by the fact that the desorption of zinc is faster than at binding temperatures below 500° C. The maximum temperature of the process in accordance with the invention is, in this case, about 500° C.

EXAMPLE 2

The preparation of a zinc/zeolite catalyst

If the vapour pressure of a metal is low (e.g. less than 0.1 mbar) within the temperature range used for the preparation of a catalyst, more volatile inorganic metal compounds or organo metal compounds can be employed.

Thus, zinc/zeolite catalysts were also prepared starting from zinc chloride. The binding temperature was in the range from 355° C. to 455° C. A steam treatment was effected in order to reduce the amount of the chloride ion residue on the catalyst. Instead of steam, hydrogen sulphide may, for instance, be used as well.

In the above manner catalysts were provided having zinc contents in the order of 1% w/w.

Figure 3:
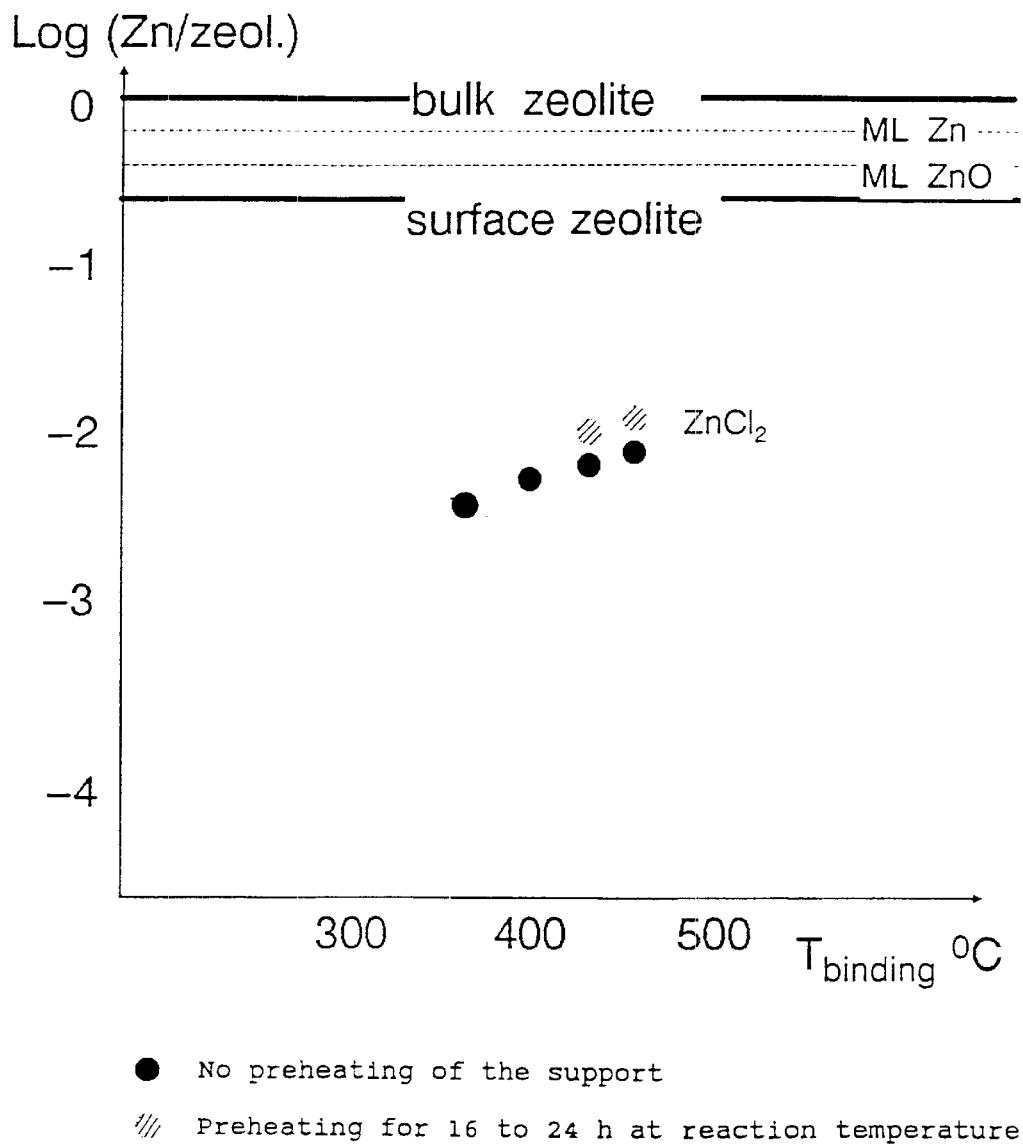
Figure 4:
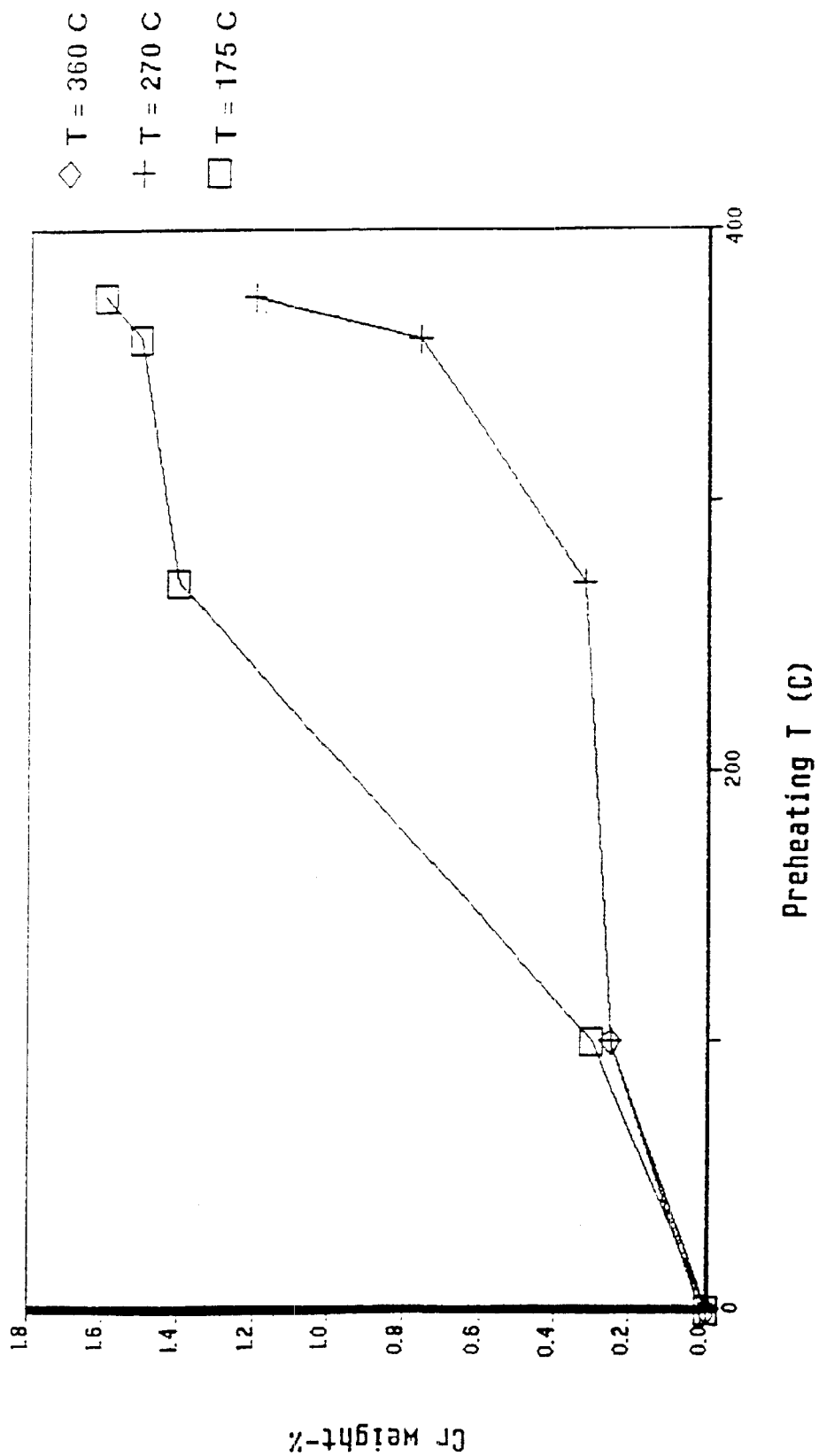
FIG. 4 portrays the influence of support preheating on the binding of chromium from $CrO_2C_2$ to silica.

FIG. 3 depicts the binding of zinc from ZnCl$_2$ to zeolite as a function of the reaction temperature.

EXAMPLE 3

The activity of the zinc/zeolite catalysts

The activity of the zeolite-supported zinc catalysts was evaluated by testing the catalysts for the conversion of n-butane into aromatics and for aromatic selectivity. The test were carried out in a microreactor at ambient pressure and at temperatures ranging from 450 to 500° C. The quantity of the catalyst batch loaded in the reactor was 5.0 g and the feed rate of n-butane into the reactor was 5 g/h. The reaction was monitored with the help of gas chromatography, a sample being taken after each run of five hours at 450° C. constant temperature.

Out of the zeolite-supported zinc catalysts prepared according to the invention, three catalyst were subjected to analysis runs. Two of the catalysts had been prepared at 430° C. and the third one at 470° C. The catalysts contained 0.66, 0.65 and 1.07% w/w, respectively, of zinc. The support of the first catalyst had been pretreated for 2 hours at 500° C. before the binding reaction. Reference catalysts were prepared by the dry impregnation technique, which involved impregnating 0.5 ml zinc nitrate solution into each g of an H-ZSM5-zeolite/silica support. Said catalysts were dried at 115° C. for 12 h, and subsequently calcined at 540° C. for 4 hours. The catalysts prepared by impregnation contained 0.15 and 1.4% w/w, respectively, of zinc.

The test results are shown in Table 2:

TABLE 2

Butane conversion and aromatic yield

| Catalyst | Zn conc. [% w/w] | Butane conversion [% w/w] | Aromatic selectivity [%] | Yield [% w/w] |
|---|---|---|---|---|
| Present invention | | | | |
| 3.1 | 0.66 | 41.4 | 36.0 | 14.9 |
| 3.2 | 0.65 | 48.4 | 40.3 | 19.5 |
| 3.3 | 1.07 | 41.8 | 37.2 | 15.5 |
| Reference | | | | |
| 3.4 | 1.40 | 30.6 | 37.2 | 11.6 |
| 3.5 | 1.41 | 31.4 | 39.2 | 12.3 |
| 3.6 | 0.15 | 44.4 | 17.3 | 7.7 |

As is evident from the results, the catalysts produced in accordance with the invention achieve an equal or higher degree of conversion than is obtained with the reference catalyst, while the selectivity to aromatic compounds is at least at an equal level. Both the conversion and the aromatic selectivity are on an industrially applicable level.

EXAMPLE 4

The preparation of a Re/Al$_2$O$_3$ catalyst

The Re/alumina combination is a well-known metathesis catalyst which can be used, e.g., for catalysing the disproportionation of propene to ethene and butene. Following the process outlined for the invention, rhenium was bound to the surface of γ-alumina from rhenium heptoxide, which is a solid substance at ambient temperature.

The catalysts were prepared using coarse-grain alumina as support. Re$_2$O$_7$ (Aldrich Chemicals Co., purity: 99.9%) was volatilized by heating it at 160° C. The preheating of the support and the binding of the rhenium were carried out at a 3 mbar nitrogen pressure. The reaction temperature was maintained in the range from 175 to 360° C., an increasing temperature gradient being formed from the hot source towards the reaction chamber. The rhenium heptoxide vapour was contacted with the support for 225 minutes. The rhenium content of the prepared catalyst was determined. Table 3 gives the pretreatment and reaction temperatures.

TABLE 3

Re/γ-Al$_2$O$_3$ catalysts

| | Preheating | | Reaction temperature | Re |
|---|---|---|---|---|
| Sample no. | t [h] | T [° C.] | [° C.] | [% w/w] |
| 4.1 | — | — | 175 | 0.3 |
| 4.2 | 4 | 220 | 220 | 0.1 |
| 4.3 | — | — | 360 | 0.04 |
| 4.4 | — | — | 470 | 0.65 |
| 4.5 | 18 | 470 | 475 | 0.04 |
| 4.6 | 16 | 220 | | |
| | +16 | 470 | 470 | 0.04 |
| 4.7 | 17 | 470 | 360 | 0.01 |
| 4.8 | 18 | 470 | 220 | 0.01 |

The table indicates that a long pretreatment at high temperatures decreases the amount of rhenium binding to the support. The largest amounts of rhenium are bound to the surface of alumina without any heat pretreatment.

Test were further carried out to study the influence of a Mg(thd)$_2$ addition on the support's capability to sorb rhenium. The alumina was first heated at 475° C. for 18 hours, then cooled to 240° C. and, subsequently, contacted with fumes of Mg(thd)$_2$ that had been volatilized at a temperature ranging from 75° C. to 85° C. In this case, 0.36% rhenium was bound to the support from rhenium heptoxide. In a reference test, in which no magnesium dipivaloylmethane was used, the rhenium content was 0.12%. Thus, the amount of Re bound to the support was tripled by the Mg(thd)$_2$ treatment.

The amount of Re bound to the support was rather small in all the tests (<0.65%) in comparison to conventional Re metathesis catalysts that can have a Re content of up to 15%. The activity of the prepared catalysts were assessed on basis of propeneconversion. The results indicated that the Re activities on a weight basis were at least as high as those of conventional catalysts, and in several cases much higher. Thus, in the case of the catalyst 4.2, the propene conversion per weight unit of Re was as high as over 6% and in the case of catalyst 4.8 even exceeded 15%.

EXAMPLE 5

The preparation of a chromium/silica catalyst

Silica-supported chromium is a known Phillips-type polymerization catalyst. The following example will show in more detail how the preheating and the reaction temperatures influence the binding of chromium in the process according to the invention.

Chromyl chloride, CrO$_2$Cl$_2$ was used as a starting compound for the chromium. A silica support (Crosfield Catalysts EP 10 silica gel) the amount of which was 4 to 5.5 g, was preheated at 100° C. to 360° C. in a nitrogen gas atmosphere at a pressure of 3 to 4 mbar for 17 to 20 hours. After the preheating the temperature was adjusted to the actual process temperature. Chromyl chloride was evaporated and reacted with the silica at 175, 270 and 365° C. temperatures. The reaction time was in excess of 1.5 hours, typically 2.5 hours.

Table 4 gives the test operating conditions of three Cr catalyst tests:

TABLE 4

Operating conditions of Cr catalyst tests

| | Preheating | | Reaction temp. | CrO$_2$Cl$_2$ | Time |
|---|---|---|---|---|---|
| Test No. | T [° C.] | t [h] | T [° C.] | moles/g/run | [min] |
| 5.1 | 360 | 20 | 1.75 | 0.2 | 97 |
| 5.2 | 360 | 17 | 175 | 0.13 | 150 |
| 5.3 | 100 | 17 | 175 | 0.10 | 150 |

The CrO$_3$ layer completely covered the surface of the silica support and was calculated to contain about 0.16 g chromium per 1 g silica. This corresponds to a molar content of approx. 0.003 mol chromium. The reagent used in the tests exceeded the aviable binding sites on the support by about 30-to 70-fold.

The preheating temperature determines the number of OH—groups in silica and thus the number of binding sites. The chromyl chloride molecule can bind either to one or two hydroxyl groups releasing one or two molecules of HCl, respectively. The highest chromium concentrations were found after preheating at 270° C. Reaction temperatures for chromyl chloride between 150 and 330° C. did not have a major effect on the chromium concentration.

Figure 5:
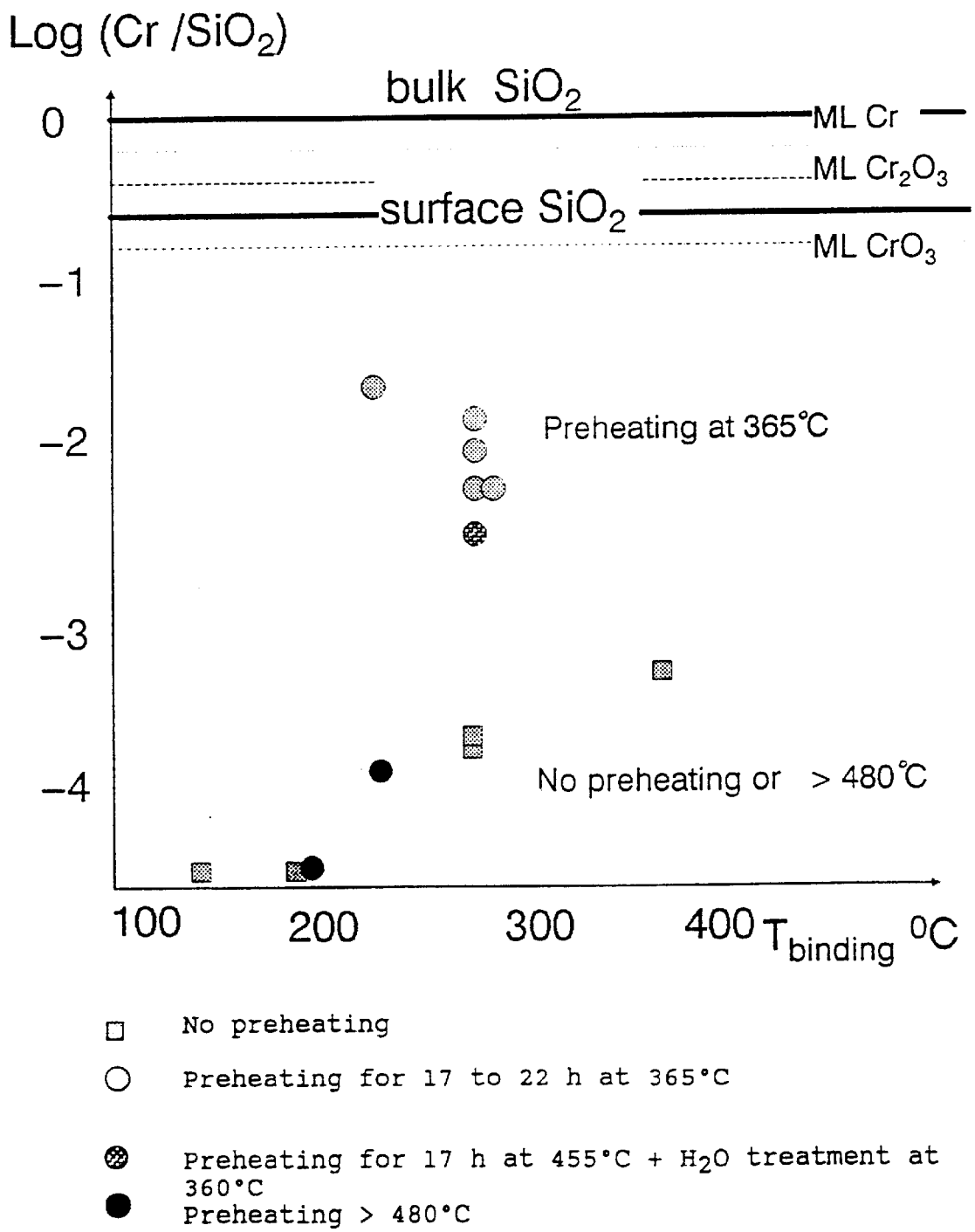
FIG. 5 depicts the binding of chromium to silica as a function of the reaction temperature.

The average Cr concentration as a function of the pretreatment temperature is shown in FIG. 5.

Figure 6:
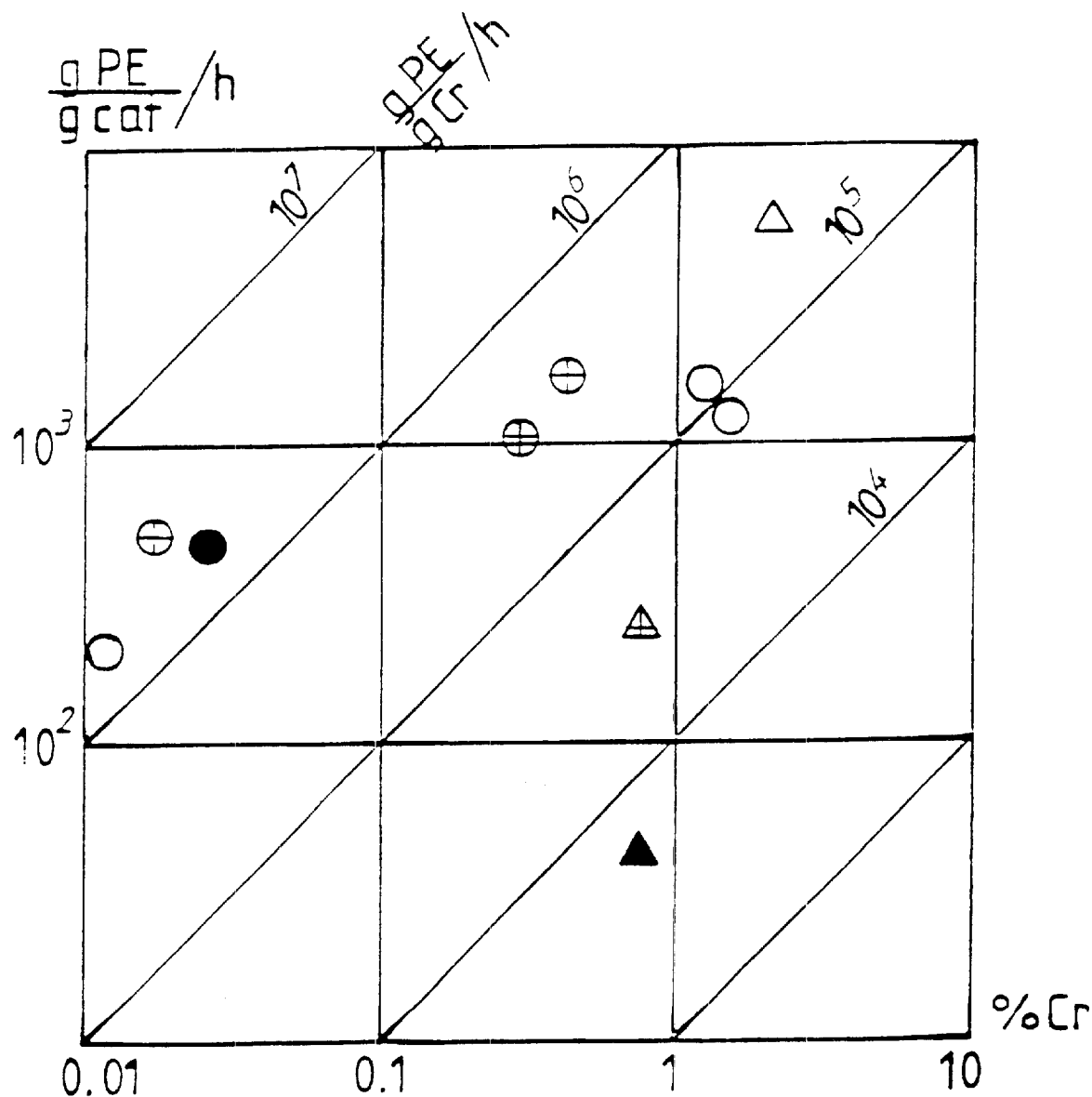
FIG. 6 illustrates the activity of a silica-supported chromium catalyst in comparison to a prior art catalyst.

FIG. 6 shows the influence of the reaction temperature on the binding of chromium. In a similar manner as in FIG. 2, the ratio between the catalytically active metal and the support molecules was calculated. The figure also includes an indication of the respective amounts of chromium and chromium oxide covering the silica surface in the form of a monolayer. When the preheating temperature is raised above 480° C., the Cr concentrations were less than 0.02%, irrespective of whether the reaction temperatures were 175, 270 or 360° C.

It is worth noting that, according to reference [10], the pretreatment should generally be conducted at a temperature of at least 400° C., preferably at a temperature in the range from 600 to 800° C.

EXAMPLE 6

Chromium-titanium/silica and chromium-aluminium/silica catalysts

In this example, the binding of a second catalytically active metal on the catalyst prepared in Example 5 was studied in detail. Table 5 contains a summary of the operating conditions of these tests:

TABLE 5

The test run conditions of Cr—Ti and Cr—Al catalysts

| | Preheating | | Reaction temp. | $CrO_2Cl_2$ | Time |
|---|---|---|---|---|---|
| Test No. | T [° C.] | t [h] | T [° C.] | moles/g/run | [min] |
| 6.1 | 455 | 17 | 270 | 0.18 | 150 |
| 6.2 | 360 | 20 | 270 | 0.15 | 150 |
| 6.3 | 360 | 17 | 270 | 0.29 | 150 |
| 6.4 | 360 | 17 | 270 | 0.14 | 150 |

In test 6.1, following the preheating step, the support was treated with steam for 75 min at 360° C., after which the chromyl chloride was added. When the reaction was completed, a new water vapour (steam) treatment was conducted at 270° C., followed by the introduction of 0.13 mol of titanium chloride ($TCl_4$) per unit weight (g) of the support into the same reaction space at the same temperature for 184 minutes. Finally, a further steam treatment was performed for 75 minutes.

In test 6.2, following the pretreatment, the support was reacted with titanium chloride (5 mmol per g of support) at 270° C. for 8.3 min. A water vapour treatment was the performed for 15 minutes at the same temperature prior to the introduction of chromyl chloride into the reaction chamber.

In test 6.3, a Cr-containing silica catalyst was prepared as described in Example 5 above. The product thus prepared was reacted with titanium chloride at 270° C. for 8.3 min. The amount of titanium chloride used corresponded to 9.5 mmol Ti/g of support.

In test 6.4, following the pretreatment, the support was first reacted with aluminum chloride ($AlCl_3$) at 270° C. for 150 minutes. The amount of aluminum corresponded to 2.4 mmol Al per unit weight (g) of the support. Steam was then introduced into the reactor chamber for 75 minutes. The chromyl chloride was added as explained in Example 5.

The catalysts prepared contained 0.016 to 0.47% w/w chromium, 0.32 to 6.2% w/w titanium and 0.49% w/w aluminum.

EXAMPLE 7

The catalyst activity of Cr/silica-based catalysts

The catalysts prepared according to Examples 5 and 6 were fluidized in dry air and heated first to 200 to 250° C., at which temperature they were held for 4 h, after which they were finally activated by calcination at an elevated temperature (580 to 780° C.) for about 5 h. The calcined material was cooled to 300° C. and the air atmosphere was replaced by an oxygen-free nitrogen atmosphere.

The catalysts thus treated were used in the polymerization of ethene. The reaction temperature was 105° C. and the total pressure 4000 kPa. The hydrocarbon diluent in the polymerization process was isobutane. The results are shown in Table 5, below.

TABLE 5

Activities of Cr and Ti containing catalysts in polymerization of ethene.

| | Elemental contents | | | | Activation | Activity |
|---|---|---|---|---|---|---|
| Test no. | Cr | Ti | Al | Cl [%] | temp [° C.] | (gPE/gcat*h) |
| 5.1 | 1.4 | | | 0.32 | 570 | 1400 |
| 5.2 | 1.5 | | | <0.01 | 780 | 1220 |
| 5.3 | 0.012 | | | 0.01 | 780 | 200 |
| 6.1 | 0.47 | 6.2 | | | 730 | 1600 |
| 6.2 | 0.016 | 0.32 | | | 690 | 500 |
| 6.3 | 0.29 | 1.3 | | 3.2 | 790 | 1000 |
| 6.4 | 0.026 | | 0.49 | 3.5 | 750 | 475 |

As is evident from the results, the catalysts have a very high activity even in those cases where the metal content is low.

The catalyst activity of the catalysts prepared according to the invention have also been compared with the catalyst disclosed in reference [10]. The results are given in FIG. 6. In FIG. 6, the X-axis indicates the percentage of chromium in the catalysts, and the Y-axis gives the amount of polyethylene formed per weight of the catalyst on an hourly basis. The lines drawn at an angle of 45° to the X-axis indicate the amount of polyethylene formed per hour in relation to the weight of the chromium on the catalyst.

The McDaniel and Stricklen catalysts contain about 1% Cr.

FIG. 6 shows that, calculated on the basis of PE-conversion per unit catalyst weight, the present Cr catalyst attains almost as high an activity at lower Cr loadings as the best prior art catalysts. At the same time, it should be noted that the known catalysts have been subjected to a separate reducing treatment. From a calculation of the catalyst activity on the basis of the amount of chromium, it appears that the catalysts prepared according to the invention are considerably more active that the prior art catalysts. The addition of titanium increases the activity of Cr+Ti catalysts. Since the catalysts is retained in the product after the reaction, a decrease in the amount of Cr will provide a valuable additional benefit for catalysts prepared according to the invention.

We claim:

1. A process for preparing a heterogeneous catalyst having at least one catalytically active species bound to the surface of a support material, said process comprising the steps of:

(A) selecting the amount of catalytically active-species to be present in the heterogeneous catalyst;

(B) pretreating a surface of a support material to provide a number of binding sites corresponding to the amount of catalytically active species to be present in the heterogeneous catalyst, as recited in step (A), wherein said pretreating comprises heat treatment, comprising increasing the temperature of the support to at least the same temperature as used to bind the catalytically active component, or chemical treatment, comprising treatment with steam or a dehydrating agent to add or remove hydroxyl groups, or both;

(C) vaporizing a reagent containing a precursor of a catalytically active species to form a vapor;

(D) introducing the vapor into a reaction chamber where the support material is kept at a higher temperature than the condensation temperature of the vaporized reagent, and contacting the vaporized reagent with the support material, whereby at least a portion,of the precursor of the catalytically active species in the vaporized reagent binds to the support material, wherein the pretreatment of the support occurs in the reaction chamber, wherein the vapor pressure of the vaporized reagent in the reaction chamber is sufficiently high and the duration of contacting between the vaporized reagent and the support material is sufficiently long that the reaction chamber contains an amount of precursor of catalytically active species that is at least equal to the number of available binding sites on the support material, wherein the temperature of the support material is sufficiently high that chemisorption of the precursor of the catalytically active species occurs, wherein the duration of contacting between the support material and the vaporized reagent is sufficiently long that all of the surface binding sites of the support material have been occupied by the precursor of the catalytically active species, whereby the surface binding sites of the support material are saturated at the prevailing temperature, and wherein said pretreated support is not removed from the reactor or exposed to ambient air between pretreatment and introduction of said vapor;

(E) removing vaporized reagent containing any precursor of catalytically active species not bound to the support; and (F) posttreating the precursor of the catalytically active species bound to the support to convert it into catalytically active form.

2. The process as claimed in claim 1, wherein the reaction chamber contains an excess of the precursor of the catalytically active species in relation to the available binding sites on the support material.

3. The process as claimed in claim 1, wherein the temperature of the support material is below the temperature at which the the precursor of the catalytically active species begins to desorb from the support material.

4. The process as claimed in claim 1, wherein said vaporization of said catalyst reagent occurs in a separate space from the reaction chamber, and wherein an increasing temperature gradient exists between said separate vaporization space and said reaction chamber.

5. The process as claimed in claim 1, wherein said pretreatment step (B) comprises heating the support material to a temperature that is higher than the temperature of the chemisorption reaction of step (D).

6. The process as claimed in claim 1, wherein said pretreatment step (B) comprises both the temperature increase and chemical processing with steam or a dehydrating agent.

7. The process as claimed in claim 1, wherein said contacting occurs at reduced pressure.

8. The process as claimed in claim 7, wherein said reduced pressure is in the range of 0.1 to 100 mbar.

9. The process as claimed in claim 1, wherein said posttreatment comprises heat treatment under oxidizing or reducing conditions, whereby the oxidation state of the catalytically active site is modified.

10. The process as claimed in claim 1, wherein said posttreatment comprises heat treatment with a vapor under conditions effective to modify the surroundings of the bound catalytically active species or the bound precursor of the catalytically active species.

11. The process as claimed in claim 10, wherein said vapor is steam.

12. The process as claimed in claim 1, wherein the process steps are repeated at least once for at least one additional catalytically active species or precursor of a catalytically active species.

13. The process as claimed in claim 1, wherein the temperature during steps (B), (C), (D), (E) and (F) is higher than the condensation temperature of each catalytically active reagent used.

* * * * *